United States Patent [19]

Maggs

[11] Patent Number: 4,732,805

[45] Date of Patent: Mar. 22, 1988

[54] ACTIVATED CARBON

[75] Inventor: Frederick A. P. Maggs, Wiltshire, England

[73] Assignee: Charcoal Cloth Ltd., Berkshire, England

[21] Appl. No.: 908,902

[22] Filed: Sep. 18, 1986

Related U.S. Application Data

[63] Continuation of Ser. No. 658,185, Oct. 5, 1984, abandoned.

[51] Int. Cl.⁴ ................................................. B32B 5/30
[52] U.S. Cl. .................................... 428/240; 427/180;
427/195; 427/372.2; 427/430.1; 428/283;
428/327; 428/402; 428/408; 428/902
[58] Field of Search ............... 428/240, 283, 327, 402,
428/403, 408, 367, 372, 902; 427/180, 195,
372.2, 430.1

[56] References Cited

U.S. PATENT DOCUMENTS

| | | | |
|---|---|---|---|
| 3,108,018 | 10/1963 | Lewis | 428/408 |
| 4,169,187 | 9/1979 | Glazar | 428/422 |
| 4,194,041 | 3/1980 | Gore et al. | 428/422 |
| 4,217,386 | 8/1980 | Arons et al. | 428/408 |
| 4,431,698 | 2/1984 | Case et al. | 428/422 |
| 4,508,775 | 4/1985 | Adiletta | 428/422 |
| 4,565,727 | 1/1986 | Giglia et al. | 428/283 |

*Primary Examiner*—Paul J. Thibodeau
*Attorney, Agent, or Firm*—Jeffers, Hoffman & Niewyk

[57] ABSTRACT

An active carbon material includes a gas permeable surface coating of particulate hydrophobic material which renders the active carbon waterproof while still permitting it to adsorb undesirable components. Preferably the hydrophobic material is polytetrafluoroethylene having a mean particle size of substantially a tenth of a micron. Active carbon is waterproofed by immersing it in an aqueous suspension of the hydrophobic material and then drying the active carbon to remove the water to leave the particulate coating of hydrophobic material on the outer surface of the active carbon.

24 Claims, No Drawings

ACTIVATED CARBON

This is a continuation of application Ser. No. 658,185, filed Oct. 5, 1984, now abandoned.

BACKGROUND OF THE INVENTION

Activated carbon comes in a variety of forms. Recently, it has been made in the form of a fabric known as charcoal cloth and a felted material but, previously it has usually been in the form of granules. Activated carbon is used to adsorb undesirable components from the atmosphere or from a local environment. Activated carbon will also adsorb other components which are not undesirable but which saturate the activated carbon and so prevent it from adsorbing the undesirable components. The principal component which leads to such saturation of activated carbon is water. For example, charcoal cloth can adsorb up to three times its own weight of water and charcoal felt can adsorb up to ten times its own weight of water.

One of the uses of activated carbon is its use in clothing to provide protection against undesirable components and when such clothing is wetted its effectiveness in adsorbing the undesirable components is drastically reduced. Also, the weight of the clothing once it is saturated with water is greatly increased which is a further disadvantage. To overcome this at present, clothing is not made entirely from charcoal cloth and, instead, is formed as a laminate with an outer layer of fabric which typically includes a waterproofing agent such as a silicone and an inside layer of charcoal cloth or felt. Activated carbon is also used in the filters of respirators and other filters and again these tend to become saturated with water so preventing them prematurely from adsorbing undesirable components.

SUMMARY OF THE INVENTION

According to a first aspect of this invention an active carbon material includes a gas permeable surface coating of particulate hydrophobic material which renders the active carbon waterproof.

The particulate hydrophobic material may be a polymer material such as polypropylene or polyethylene or a polymerised halogen substituted alkane. Preferably the material is a fluorocarbon resin and it is particularly preferred that the material is polytetrafluoroethylene.

Preferably the particle size of the particulate hydrophobic material is generally in a range between one and one hundredth of a micron and it is particularly preferred that the particles have a mean particle size of substantially a tenth of a micron.

When the active carbon is in the form of a cloth it is preferred that the hydrophobic material is present in a range from about 5 to 10% by weight of the active carbon.

It is preferred that no binder or other component is included and it is believed that the particulate hydrophobic material is held in contact with the outer surface of the active carbon by surface forces developed between the particles of the hydrophobic material and the outer surface of the active carbon. It is believed that a layer of closely spaced particles of the hydrophobic material adhere to the outer surface of the active carbon to form a layer which is typically substantially only a single particle in thickness. It is thought that the particles of the hydrophobic material do not enter the interstices of the active carbon but simply remain on the outer surface. Spaces between adjacent particles of the hydrophobic material enable gases, vapours and bacteria to pass through the surface coating of the hydrophobic material and into the interstices of the active carbon to be adsorbed into the interstices of the active carbon. However, water in liquid form is repelled by the layer of hydrophobic material and the water meniscus does not penetrate the spaces between adjacent particles which because of their hydrophobic nature have a large angle of contact with the liquid water. Thus, the active carbon is waterproof in that it does not adsorb water in its liquid state but can still adsorb undesirable components.

According to another aspect of this invention a method of waterproofing activated carbon comprises immersing activated carbon in an aqueous suspension of a hydrophobic material and then drying the active carbon to remove the water to leave a particulate coating of hydrophobic material on the outer surface of the active carbon.

The hydrophobic material may be present in the suspension in a range from 0.25% to 2.5% weight for weight but it is preferred that the hydrophobic material is present at a concentration of at least 1.5% by weight.

Preferably the particle size of the particles of the hydrophobic material in suspension is between one and one hundredth of a micron and it is especially preferred that the particles have sizes distributed throughout this range with a mean particle size of one tenth of a micron.

A preferred hydrophobic material is a fluorocarbon resin, particularly polytetrafluoroethylene. In this case the suspension is preferably stabilized by an anionic wetting agent.

The step of removing water from the active carbon after it has been immersed in the suspension of hydrophobic material may simply be an air drying step but preferably it is a force-drying step involving a moving flow of air which has preferably been heated. Typically the moving flow of air is heated to a temperature around 100° C.

DESCRIPTION OF PREFERRED AND COMPARATIVE EXAMPLES

Various examples of waterproof active carbon and its preparation will now be described with reference to the following experiments.

To enable a quantitative assessment of the degree of water-repellency of an active carbon fabric to be made when performing the experiments subsequently described a standard test was devised to test the degree of water-repellency of the resulting fabric. This standard test consists of supporting a specimen of the fabric to be tested on a piece of blotting paper held in a plane extending at 45° to the vertical and then directing a fine jet of water from a wash-bottle at the upper surface of the fabric. The behaviour of the stream of water on coming into contact with the surface of the fabric was assessed and a number ascribed to this behaviour with 10 indicating complete water-repellency of the fabric and zero indicating rapid and complete wetting of the fabric as follows:

| Water Repellancy Index (WRI) | |
|---|---|
| 10 | All droplets run off and none penetrate. |
| 7 | A few droplets are held (as droplets), very few penetrate the cloth. |

-continued

| Water Repellancy Index (WRI) | |
|---|---|
| 5 | Most droplets run off, but a few wet the cloth. |
| 3 | Drops do not run off, but a low angle of contact can still be observed; about half of the captured drops wet the cloth and penetrate. |
| 0 | Rapid and complete wetting indistinguishable from untreated cloth. |

The main series of experiments that were performed used an aqueous dispersion of polytetrafluoroetylene stabilized with an anionic wetting agent and having a primary particle size of substantially 0.1 microns. Such a material is marketed under the trade name Fluon GP2 dispersion by Imperial Chemical Industries Limited. The dispersion has a relative density of 1.45 and a PTFE content of 54% by weight, approximately 0.8 kilograms dry polytetrafluoroethylene per liter. In the following experiments unless otherwise specifically noted the following experimental procedure was followed. Firstly small samples of active carbon fabric were treated and tested. Typically the size of these samples was between 25 and 50 cm². Within each series of experiments the samples were cut from adjacent areas of a length of fabric to minimize variations of the properties of the fabric. In each series of experiments the samples were dipped in a similar quantity of freshly prepared suspension, typically 20 ml for a period of ten seconds. The samples after dipping were laid on blotting paper which absorbed the excess liquid, and were then transferred to glazed paper for oven drying at a temperature of about 120° C. The treated samples were then exposed to atmospheric moisture for at least five minutes before testing for water repellency.

EXPERIMENT 1

This experiment was designed to test the effect of varying the concentration of the suspension of polytetrafluoroethylene on the degree of water repellency obtained. In this experiment dried and weighed samples of nine different cloths were allowed to stand in air for ten minutes before being immersed in suspensions of polytetrafluoroethylene of various strengths. Two separate series of experiments were made the first with samples A to F and the second with samples G to J. The results of these two series of tests are shown in Tables I and 2.

TABLE 1

| Fabric | A | B | C | D | E | F | PTFE conc % by weight |
|---|---|---|---|---|---|---|---|
| weight/unit area mg/cm² | 9.4 | 12.2 | 8.7 | 11.5 | 12.9 | 12.6 | |
| % weight of PTFE held | 15 | 23 | 15 | 14 | — | — | 3.6 |
| WRI | 9 | 10 | 8 | 9 | — | — | |
| % weight of PTFE held | 10 | 15 | 10 | 9 | 7 | 6 | 1.8 |
| WRI | 9 | 10 | 8 | 9 | 8 | 10 | |
| % weight of PTFE held | 6 | 6 | 6 | 4 | — | — | 0.9 |
| WRI | 9 | 9 | 7 | 6 | — | — | |
| % weight of PTFE held | 3 | 3 | 2 | 2 | — | — | 0.45 |
| WRI | 6 | 7 | 1 | 3 | — | — | |
| % weight of PTFE held | 1 | 1 | 1 | 0 | — | — | 0.22 |
| WRI | 1 | 7 | 2 | 0 | — | — | |

TABLE 2

| Fabric | G | H | I | J | PTFE conc % by weight |
|---|---|---|---|---|---|
| weight/unit area mg/cm² | 11.6 | 13.6 | 11.8 | 11.0 | |
| % weight of PTFE held | 6 | 8 | 6 | 7 | 1.5 |
| WRI | 10 | 10 | 8 | 9 | |
| % weight of PTFE held | 3 | 2 | 3 | 4 | 0.75 |
| WRI | 8 | 6 | 2 | 8 | |
| % weight of PTFE held | — | — | — | — | 0.38 |
| WRI | 1 | 3 | 0 | 1 | |

The results of the experiments shown in Tables 1 and 2 indicate that the degree of water repellence improves as the strength of the suspension of polytetrafluoroethylene is increased from zero to 1.5% by weight and thereafter is approximately constant. For future treatments a polytetrafluoroethylene suspension having a concentration of 1.5% by weight was therefore used.

EXPERIMENT 2

Further samples of the nine fabrics A to J were treated with a 1.5% by weight suspension of polytetrafluoroethylene. Their water repellent indexes were noted. The samples were then dried and weighed and exposed to saturated carbon tetrachloride vapour overnight before being reweighed. The results of this test are shown in Table 3.

TABLE 3

| Fabric | A | B | C | E | F | G | H | I | J |
|---|---|---|---|---|---|---|---|---|---|
| Untreated CCl₄ adsorb % w/w | 76 | 68 | 61 | 50 | 56 | 56 | 44 | 52 | 69 |
| Treated CCl₄ adsorb % w/w | 73 | 65 | 63 | 46 | 56 | 58 | 41 | 51 | 66 |
| WRI | 9 | 10 | 9 | 10 | 9 | 10 | 9 | 7 | 8 |

The results of this experiment show that treatment with a 1.5% by weight suspension of polytetrafluoroethylene provide good water repellency with very little change in the adsorptive properties of the active carbon fabric.

EXPERIMENT 3

In this experiment the moisture content of the fabric samples were varied. Samples from each of the cloths A to J were taken using:
(i) absolutely dry fabric (dry);
(ii) fabric containing the moisture adsorbed by exposure to air for a period of time (moist); and,
(iii) fabric samples that have been wetted with a minimum amount of water to just wet the fabric (wet).

The specimens were then immersed in a 1.5% by weight suspension of polytetrafluoroethylene. Table 4 shows the results of this experiment and shows how the percentage of polytetrafluoroethylene held by the cloth and the water repellence index varies.

TABLE 4

| Fabric | % PTFE held by weight Moist | % PTFE held by weight Wet | WRI Dry | WRI Moist | WRI Wet |
| --- | --- | --- | --- | --- | --- |
| A | 6.2 | 4.8 | 10 | 10 | 7 |
| B | 7.5 | 8.2 | 10 | 10 | 9 |
| C | 6.4 | 5.7 | 9 | 9 | 5 |
| D | — | — | 9 | 6 | 9 |
| E | 7.2 | 2.8 | 10 | 9 | 6 |
| F | 5.5 | 3.6 | — | 10 | 6 |
| G | 8.4 | 4.3 | — | 10 | 9 |
| H | 5.3 | 5.0 | 10 | 10 | 10 |
| I | 7.1 | 4.7 | 8 | 8 | 10 |
| J | 10.9 | 13 | 9 | 10 | 9 |

The moisture content of the fabric before treatment with a polytetrafluoroethylene suspension appeared to have little influence on the degree of water repellence that is achieved and even when liquid water is present on the cloth before treatment good water repellency is generally obtained. As there seems to be some reduction in the weight of polytetrafluoroethylene held and a corresponding reduction in the degree of water repellency it is to be preferred that the fabric is not wetted before treatment.

EXPERIMENT 4

Samples of fabrics B, E and F were immersed for various periods of time in a 1.5% by weight suspension of polytetrafluoroethylene before being blotted, dried and tested to show their water repellency. The results of this test are shown in Table 5.

TABLE 5

| Time of immersion | cloth: | WRI B | WRI E | WRI F |
| --- | --- | --- | --- | --- |
| 1-2 secs | | 9 | 10 | 6 |
| 3 secs | | 9 | 10 | 8 |
| 5 secs | | 10 | 10 | 6 |
| 10 secs | | 8 | 9 | 8 |
| 30 secs | | 9 | 10 | 6 |
| 90 mins | | 9 | 10 | 9 |

This experiment shows that the treatment time does not noticably affect the degree of water repellency that is obtained.

EXPERIMENT 5

Three samples of cloth B were dried in different ways, the first sample was simply allowed to drain before being oven dried. The second sample was simply laid on blotting paper and the third sample was blotted under pressure between two sheets of blotting paper. Table 6 shows the results of this test and shows that variation in the drying technique appears to have very little influence on the amount of polytetrafluoroethylene held by the fabric.

TABLE 6

| (a) | Merely allowed to drain: wt PTFE held (after drying) | 8% |
| --- | --- | --- |
| | WRI | 10 |
| (b) | Laid on blotting paper: wt. PTFE held (after drying) | 8% |
| | WRI | 10 |
| (c) | Blotted between blotting paper, under pressure: wt. PTFE held (after drying) | 10% |
| | WRI | 10 |

The above experiments were all performed using active carbon in the form of a woven charcoal cloth.

Similar experiments were performed on a felted active charcoal fabric with broadly similar results.

Comparative experiments were also carried out using a different polytetrafluoroethylene dispersion. The different polytetrafluoroethylene dispersion is manufactured and sold by Imperial Chemical Industries under the trade name Fluon GP1 dispersion. This dispersion contains 60% by weight of polytetrafluoroethylene and has a mean particle size of around 0.2 microns. It is stablized with a non-ionic wetting agent and has a relative density of 1.5 and contains approximately 0.9 kilograms of dry polytetrafluoroethylene per liter.

EXPERIMENT 6

Twelve squares were cut from the same piece of charcoal cloth. Six pieces were treated with a 4% by volume suspension of GP1 and six with a 4% by volume suspension of GP2. Five of the specimens treated with GP2 were completely water repellent with one specimen only being slightly wetted. Three specimens of cloth treated with GP1 were partially wetted and three specimens were completely wetted.

EXPERIMENT 7

A 2.7% suspension by volume of GP1 was made up and a 2.7% suspension by volume of GP2 was made up. Four 100 cm² pieces of charcoal cloth were dried and weighed to obtain their weight per unit area and each of the four pieces was cut in half. One half of each of the four pieces was treated by the GP1 suspension by being dipped in it for one minute, laid on blotting paper and then oven dried at about 130° C., whilst the other halves of the four pieces were treated by a one minute dip in the GP2 suspension, laid on blotting paper and then oven dried at around 130° C. The treated samples were then examined for their water repellency after being allowed to cool for twenty minutes at ambient humidity. Table 7 gives the results of these experiments.

TABLE 7

| weight/unit area mg/cm² | 10.5 | 10.8 | 13.6 | 14.2 |
| --- | --- | --- | --- | --- |
| GP1 | 8 | 3 | 6 | 3 |
| GP2 | 10 | 8 | 10 | 10 |

These comparative experiments show that GP2 which is the polytetrafluoroethylene suspension having smaller particle size, in general, give greater water repellence than the samples treated with GP1.

Experiments have also been performed with active carbon in granular form. For these experiments the earlier test to obtain the degree of water repellence of the coated active carbon was not usable and instead the degree of water repellence of the granular active carbon was tested by shaking the treated granules with 50 ml of water and then determining the fraction which floated at the surface of the water by removing the floating fraction, drying them, and then weighing them to arrive at a fractional percentage by weight.

EXPERIMENT 8

A well activated nutshell charcoal having a grain size of 14×25 B.S.S. was treated by immersing 1 gram of dried charcoal in 10 ml of a suspension of polytetrafluoroethylene derived from Fluon GP2. The concentration of the suspension was varied. The granules were drained on blotting paper and then oven dried. After being tested to determine their degree of water repellence the treated samples of the charcoal were dried and then exposed to carbon tetrachloride vapour until they attained a constant weight. Table 8 shows the results of these experiments.

TABLE 8

| PTFE conc % by weight | 6 | 3 | 1.5 | 0.75 | 0.0 |
|---|---|---|---|---|---|
| % floating by weight | 99 | 94 | 70 | 30 | 0 |
| % CCl$_4$ adsorbed | 63 | 65 | 62 | — | 61 |

The results of this experiment show that the adsorption of carbon tetrachloride vapour is substantially unimpaired by the treatment with the polytetrafluoroethylene suspension and shows that a treatment of the granular charcoal with a polytetrafluoroethylene suspension of at least 1.5% by weight gives acceptable results but shows that a greater degree of water repellence can be gained by treatment with a suspension having a polytetrafluoroethylene content as high as 3% by weight.

I claim:

1. A waterproof cloth comprising a fabric of active carbon material having a coating of discrete solid particles of a particulate hydrophobic material deposited on its surface, said particulate hydrophobic material being present in a range from 5% to 10% by weight of said active carbon material, which renders said active carbon material substantially waterproof, and whereby said surface coating is permeable by a gas.

2. The active carbon material of claim 1, wherein said particulate hydrophobic material is a fluorocarbon resin.

3. The active carbon material of claim 1, wherein said fluorocarbon resin is polytetrafluoroethylene.

4. The active carbon material of claim 1, wherein said particulate hydrophobic material has a particle size in a range from approximately one to approximately one hundredth of a micron.

5. The active carbon material of claim 4, wherein said particles of said hydrophobic material have a mean particle size of approximately a tenth of a micron.

6. The active carbon material of claim 3, wherein said polytetrafluoroethylene has a particle size in a range from approximately one to approximately one hundredth of a micron.

7. The active carbon material of claim 6, wherein said particles of polytetrafluoroethylene have a mean particle size of approximately a tenth of a micron.

8. An active carbon cloth material including a surface coating of polytetrafluoroethylene substantially only a single particle in thickness, said surface coating rendering said active carbon cloth substantially waterproof and allowing gas to permeate there-through, said particles of polytetrafluoroethylene being held onto said active carbon cloth material only by surface forces developed between said active carbon cloth material and said particles of polytetrafluoroethylene, said particles of polytetrafluoroethylene having a particle size in a range from one to one hundredth of a micron and being present in a range from 5 to 10% by weight of the active carbon cloth material.

9. A waterproof cloth comprising a cloth of active carbon material having a coating of discrete solid particles of a particulate hydrophobic material deposited on its surface, said particulate hydrophobic material being present in an amount sufficient to render said active carbon material substantially waterproof, and in an amount whereby said surface coating is permeable by a gas, which surface coating of hydrophobic material is a layer substantially only a single particle in thickness held onto said active carbon material only by surface forces developed between said active carbon and said particles of hydrophobic material.

10. The waterproof cloth as claimed in claim 9, wherein said layer of particulate hydrophobic material is polytetrafluoroethylene.

11. The waterproof cloth as claimed in claim 9, wherein said hydrophobic material is present in a range from 5 to 10% by weight of said active carbon material.

12. A method of waterproofing a fabric of active carbon material comprising depositing discrete solid particles of a particulate hydrophobic material onto the surface of said active carbon material in an amount in a range between 5% to 10% by weight of said active carbon material to render said active carbon material substantially waterproof, and whereby said surface coating is permeable by a gas.

13. The method of claim 12 wherein the step of depositing particulate hydrophobic material comprises immersing said active carbon material in an aqueous suspension of the hydrophobic material, and then drying said active carbon material to remove water to leave a particulate coating of said hydrophobic material on the outer surface of said active carbon material in an amount sufficient to render said active carbon material substantially waterproof, and in an amount whereby said surface coating is permeable by a gas.

14. The method of claim 13, wherein said hydrophobic material is present in said aqueous suspension in a range from approximately 0.25% to approximately 2.5% by weight.

15. The method of claim 14, wherein said hydrophobic material is present at a concentration of at least 1.5% by weight.

16. The method of claim 13, wherein said particles of said hydrophobic material in suspension have a particle size between one and one hundredth of a micron.

17. The method of claim 16, wherein said particles of hydrophobic material have sizes distributed throughout said range and have a mean particle size of substantially a tenth of a micron.

18. The method of claim 13, wherein said suspension is a suspension of polytetrafluoroethylene particles stabilized with an anionic wetting agent.

19. The method of claim 13, wherein said active carbon material is dried by a heated moving flow of air.

20. The method of claim 19, wherein said active carbon material is dried by a moving flow of air at a temperature in a range from 100° C. to 120° C.

21. The method of claim 19, wherein said suspension is a suspension of polytetrafluoroethylene particles stabilized with an anionic wetting agent.

22. The method of claim 13, wherein said suspension is a suspension of polytetrafluoroethylene particles stabilized with an anionic wetting agent, and wherein said polytetrafluoroethylene is present in said aqueous suspension in a range from approximately 1.5% to 2.5% by weight.

23. The method of claim 22, wherein said particles of said polytetrafluoroethylene in suspension have a particle size between one and one hundredth of a micron, and wherein said particles of polytetrafluoroethylene have sizes distributed throughout said range and have a mean particle size of substantially one tenth of a micron.

24. The method of claim 23, wherein said active carbon material is dried by a heated moving flow of air.

* * * * *